(12) United States Patent
Koshy et al.

(10) Patent No.: US 7,653,196 B2
(45) Date of Patent: Jan. 26, 2010

(54) APPARATUS AND METHOD FOR PERFORMING RC4 CIPHERING

(75) Inventors: Kamal J. Koshy, Milpitas, CA (US);
Jaroslaw J. Sydir, San Jose, CA (US);
Wajdi K. Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 552 days.

(21) Appl. No.: 10/833,478

(22) Filed: Apr. 27, 2004

(65) Prior Publication Data

US 2005/0240764 A1 Oct. 27, 2005

(51) Int. Cl.
*H04L 9/06* (2006.01)
(52) U.S. Cl. .......................................... 380/28; 713/170
(58) Field of Classification Search ................. 713/170; 380/28
See application file for complete search history.

(56) References Cited

U.S. PATENT DOCUMENTS

| 5,444,781 | A | 8/1995 | Lynn et al. | |
| 6,088,800 | A * | 7/2000 | Jones et al. | 713/189 |
| 6,434,699 | B1 * | 8/2002 | Jones et al. | 713/168 |
| 6,549,622 | B1 | 4/2003 | Matthews | |
| 7,295,672 | B2 * | 11/2007 | Rarick et al. | 380/42 |
| 2005/0010527 | A1* | 1/2005 | Rarick et al. | 705/50 |
| 2005/0175176 | A1* | 8/2005 | Venkatesan et al. | 380/42 |

FOREIGN PATENT DOCUMENTS

EP 1 289 188 A 3/2003

OTHER PUBLICATIONS

Kitsos P. et al. "Hardware Implementation of the RC4 Stream Cipher" Proceedings of the 46th IEEE International Midwest Symposium on Circuits and Systems, 2003. Publication Date Dec. 27-30, 2003. pp. 1363-1366.*
"Cache (thing)" Web Page published Nov. 13, 1999 http://www.everything2.com/index.pl?node_id=80717&displaytype=printable.*
"Cache Behavior Analysis" Web page published Nov. 21, 2002. (pp. 1-3) http://www.everything2.com/index.pl?node_id=1391468&displaytype=printable.*
"Thank You Bob Anderson" http://cypherpunks.venona.com/archive/1994/09/msg00304.html.*
Comer, Douglas. Internetworking with TCP/IP, vol. I. © 1995 Prentice Hall, Inc. pp. 21 and 22.*

(Continued)

*Primary Examiner*—Beemnet W Dada
*Assistant Examiner*—Thomas Gyorfi
(74) *Attorney, Agent, or Firm*—Grossman, Tucker, Perreault & Pfleger, PLLC

(57) ABSTRACT

An arrangement is provided for performing RC4 ciphering. The arrangement includes apparatuses and methods that pipeline generation of a key stream based on a byte state array, called the S-box, which is initially generated from a secret key shared by a receiver and a transmitter in a network system. The S-box is stored in a storage device which may be a register file with two read ports and one write port. A cache is used to store a number of bytes read from the S-box storage device.

20 Claims, 7 Drawing Sheets

OTHER PUBLICATIONS

J. Burke et al. "Architectural Support for Fast Symmetric-Key Cryptography" Proceedings of the Ninth International Conference on Architectural Support for Programming Languages and Operating Systems (ASPLOS). Nov. 12-15, 2000. pp. 178-189.*

Smotherman, Mark. "Pipelining Review (background material from Appendix A)" Published Fall 2003 http://www.cs.clemson.edu/~mark/464/pipelining.html.*

"RC4 Encryption," Retrieved from WWW on Jan. 11, 2005: <cebrasoft.co.uk/encryption/rc4.htm>, 1 Page, CebraSoft Limited, United Kingdom.

International Patent Application No. PCT/US2005/012071 filed Apr. 8, 2005; International Search Report & Written Opinion dated Dec. 5, 2005.

International Patent Application No. PCT/US2005/012071 filed Apr. 8, 2005; International Preliminary Report on Patentability dated Nov. 9, 2006.

Mitsuyama et al: Embedded Architecture of IEEE802.11i Cipher Algorithms. Consumer Electronics, 2004 IEEE Int'l Symposium on Reading, UK, XP010755781.

* cited by examiner

© 2004 INTEL CORPORATION

Line 1:  $i = j = 0$; /* Initializing i and j variables */
Line 2:  For each byte of a plain text
Line 3:  $i = (i + 1) \bmod 256$;
Line 4:  $j = (j + S[i]) \bmod 256$;
Line 5:  swap $(S[i], S[j])$;
Line 6:  $t = (S[i] + S[j]) \bmod 256$;
Line 7:  $K = S[t]$;
Line 8:  $Ctext = K (XOR) (Ptext)$;
Line 9:  end

FIGURE 2

| CYCLE 1 | CYCLE 2 | CYCLE 3 | CYCLE 4 | ...... | CYCLE 9 | CYCLE 10 | CYCLE 11 | CYCLE 12 |
|---|---|---|---|---|---|---|---|---|
| Raddr $i_1 - i_8$ | Raddr $j_1$ | Raddr $j_2$ | Raddr $j_3$ | ...... | Raddr $j_8$ | Raddr $i_9 - i_{16}$ | Raddr $j_9$ | Raddr $j_{10}$ |
| | | Waddr $j_1$ | Waddr $j_2$ | ...... | Waddr $j_7$ | Waddr $j_8$ | Waddr $i_1 - i_8$ | Waddr $j_9$ |
| | | Raddr $t_1$ $K_1$ | Raddr $t_2$ $K_2$ | ...... | Raddr $t_7$ $K_7$ | Raddr $t_8$ $K_8$ | | Raddr $t_9$ $K_9$ |

FIGURE 6

APPARATUS AND METHOD FOR PERFORMING RC4 CIPHERING

RESERVATION OF COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present disclosure relates generally to network security and, more specifically, to apparatuses and methods for performing RC4 ciphering.

2. Description

Networks enable computers and other devices to communicate. For example, networks can carry data representing video, audio, e-mail, and so forth. However, network systems are subject to many threats, including loss of privacy, loss of data integrity, identity spoofing, and denial-of-service attacks. To address these threats, many measures have been developed and employed to improve the security of network communications. For example, a Rivest Cipher 4 (RC4) algorithm is selected by the Wired Equivalent Privacy (WEP), part of the IEEE 802.11 standard, to secure Wireless Fidelity ("WiFi") networks, and by the Secure Sockets Layer (SSL) communications protocol to improve the security of communications on the Internet.

The RC4 algorithm is a symmetric key stream cipher algorithm. A symmetric key algorithm is an algorithm for cryptography that uses the same cryptographic key to encrypt and decrypt the message. Symmetric key algorithms can be divided into stream ciphers and block ciphers. Stream ciphers encrypt the bits of the message one at a time, and block ciphers take a number of bits and encrypt them as a single unit. The RC4 ciphering process operates as a pseudo-random number generator initialized from a secret key of up to 256 bytes. The RC4 ciphering process generates a series of bytes, called a key stream. Input text data ("plain text") is encrypted by performing an exclusive-or ("XOR") operation between the plain text and the key stream. The result of the XOR operation is a cipher text corresponding to the input text data. Decryption is performed by producing the same key stream and XORing it with the cipher text to reproduce the plain text. If the RC4 ciphering process is implemented in hardware, it may be more desirable to use less complex hardware components than more complex hardware components because less complex components may be more commonly available. Also in a hardware implementation, smaller die area translates to lower costs, higher yields, and often lower power, which are beneficial to network communications.

BRIEF DESCRIPTION OF THE DRAWINGS

The features and advantages of the present disclosure will become apparent from the following detailed description of the present disclosure in which:

FIG. 2 shows a pseudo code illustrating how the RC4 ciphering process encrypts a plain text;

FIG. 6 is a table illustrating the pipelining of the RC4 ciphering process, according to another embodiment of the present invention.

DETAILED DESCRIPTION

An embodiment of the present invention comprises an apparatus and method for performing RC4 ciphering. The RC4 ciphering process operates by producing a series of bytes, called a key stream. A plain text is encrypted by XORing each byte of the plain text with each byte of the key stream to produce a cipher text. Decryption is performed by producing the same key stream and XORing it with the cipher text to reproduce the plain text. The RC4 ciphering process maintains an internal state in the form of a 256 byte state array (called the S-box) and two index variables i and j. The initial values of the S-box are generated from the shared secret key (both receiver and transmitter must have the same key). The key stream is produced by manipulating the values of the S-box and i and j variables. In a typical hardware implementation of the RC4 ciphering process, the S-box is stored in a register file. Because the production of one byte of the key stream involves three read operations and two write operations with an S-box storage device, a register file with three read ports and two write ports ("3-read/2-write register file") is thus desirable for the S-box. Using a 3-read/2-write register file to store the S-box along with the pipelining technology, the key-stream production may achieve a throughput of one byte per clock cycle. However, 3-read/2-write register files are not commonly available because they are complex and more expensive compared to register files with less read/write ports. According to an embodiment of the present invention, a cache may be used to store a number of bytes read from the S-box storage device. This way, the number of read operations from the S-box storage device required per clock cycle may be reduced so that a register file with two read ports and one write port ("2-read/1-write register file") may be used to store the S-box. A 2-read/1-write register file is more common and less expensive than a 3-read/2-write register file. In one embodiment, using a cache and a 2-read/1-write register file along with the pipelining technology, the RC4 ciphering process may be implemented more efficiently in hardware than using a 3-read/2-write register file, without significantly sacrificing the throughput of the key stream generation processing.

Reference in the specification to "one embodiment" or "an embodiment" of the present disclosure means that a particular feature, structure or characteristic described in connection with the embodiment is included in at least one embodiment of the present disclosure. Thus, the appearances of the phrase "in one embodiment" appearing in various places throughout the specification are not necessarily all referring to the same embodiment.

Figure 1:
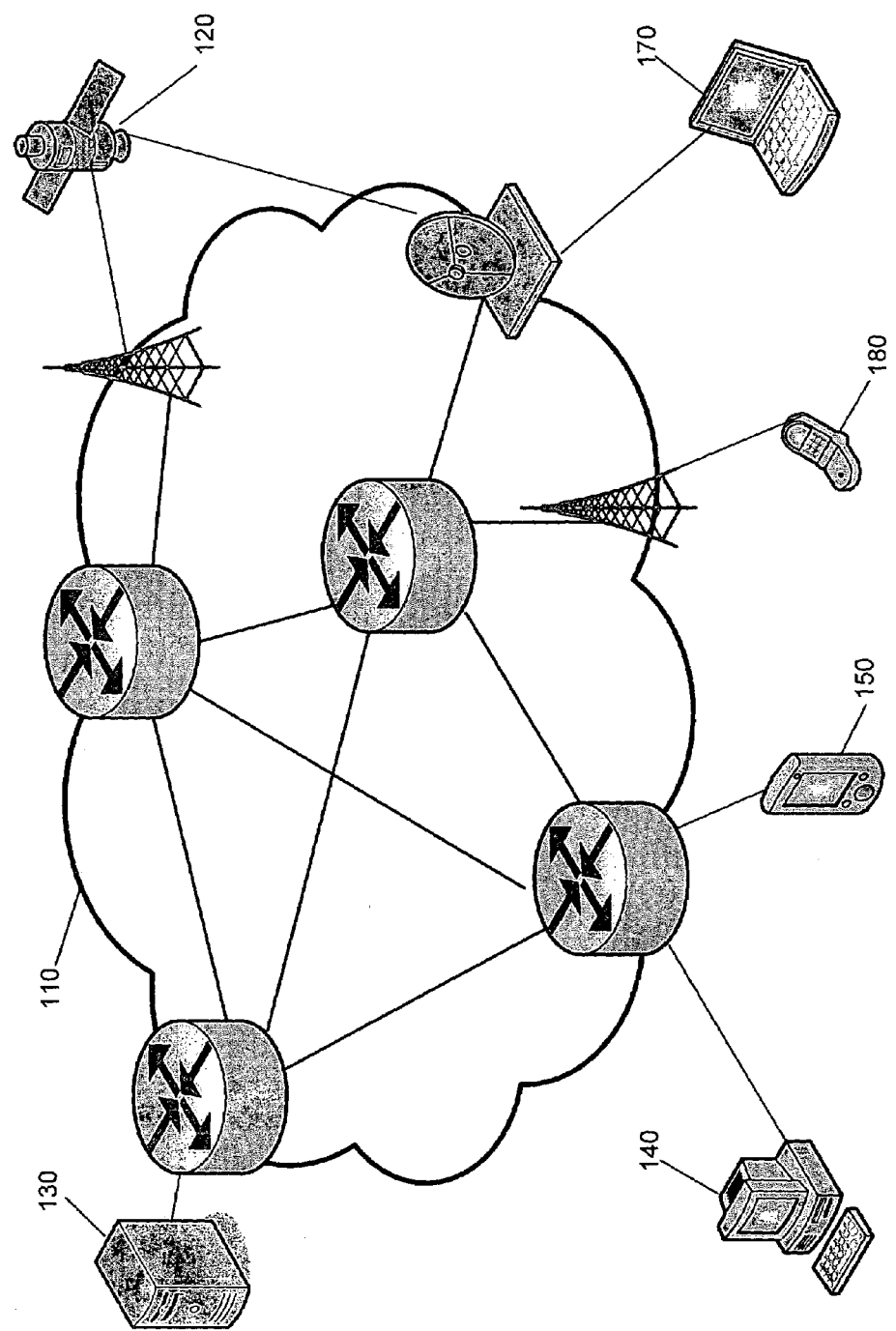
FIG. 1 is a diagram illustrating a general network system.

FIG. 1 depicts a general network system 110 that supports a number of terminals. The network system 110 may comprise a number of network devices such as routers, switches, and bridges to facilitate data passage from one terminal to another. The network system may be a wireless system, an Ethernet system, any other systems, or a combination of different network systems. The network system may employ a satellite 120 to help connect one terminal to another terminal. The terminals of the network system may comprise servers (130), desktop computers (140), personal directory assistants (PDAs) (150), cell phones (160), laptop computers (170), or other devices. Data communicated among different terminals may include video, audio, messages, and other data. The network system may use the WEP, SSL, or other standard for communication security. As a component of the WEP, SSL, or other standards, the RC4 ciphering process may be employed to encrypt data to ensure confidential communication and the integrity of communications.

FIG. 2 shows a pseudo code illustrating how a plain text is encrypted using the RC4 ciphering process. The RC4 ciphering process generates a key stream byte by byte based on the S-box. The initial values of the S-box are generated from the shared secret key. In the pseudo code as shown in FIG. 2, S[i] represents the value of the $i^{th}$ byte of the S-box, and S[j] represents the value of the $j^{th}$ byte of the S-box. K represents one byte of the generated key stream, Ptext is one byte of the plain text and Ctext is one byte of the cipher text. In line 1, the index variables i and j are initialized to 0. Line 2 starts a loop that encrypts the plain text byte by byte. In line 3, the value of index variable i is updated by increasing its previous value by 1. In line 4, the $i^{th}$ byte of the S-box is read from the S-box storage device; and the value of index variable j is updated based on its previous value and the value of the $i^{th}$ byte of the S-box, S[i]. In line 5, the value of the $i^{th}$ byte and the value of the $j^{th}$ byte of the S-box are swapped, which involves reading the $j^{th}$ byte of the S-box from the S-box storage device and writing S[i] and S[j] back to the S-box storage device as the $j^{th}$ byte and $i^{th}$ byte, respectively. In line 6, a third index t is obtained by adding S[i] and S[j] together. Because the S-box has a total of 256 bytes, the value of any index, i, j, or t, must be between 0 and 255 (including 0 and 255). This explains why "mod 256" operation is needed in obtaining i, j, or k in lines 3, 4, and 6. In line 7, the $t^{th}$ byte of the S-box is read from the S-box storage device and is used as the current byte, K, of the generated key stream. In line 8, a cipher byte, Ctext, is generated for the current byte of the plain text, Ptext, by XORing K with Ptext. The operations between line 2 and line 8 are iterated until all bytes in the plain text are encrypted. The encryption loop ends in line 9 when all bytes in the plain text are processed. The decryption process is identical to the encryption process except that described in line 8, that is, Ctext is XORed with K to generate Ptext.

Figure 3:
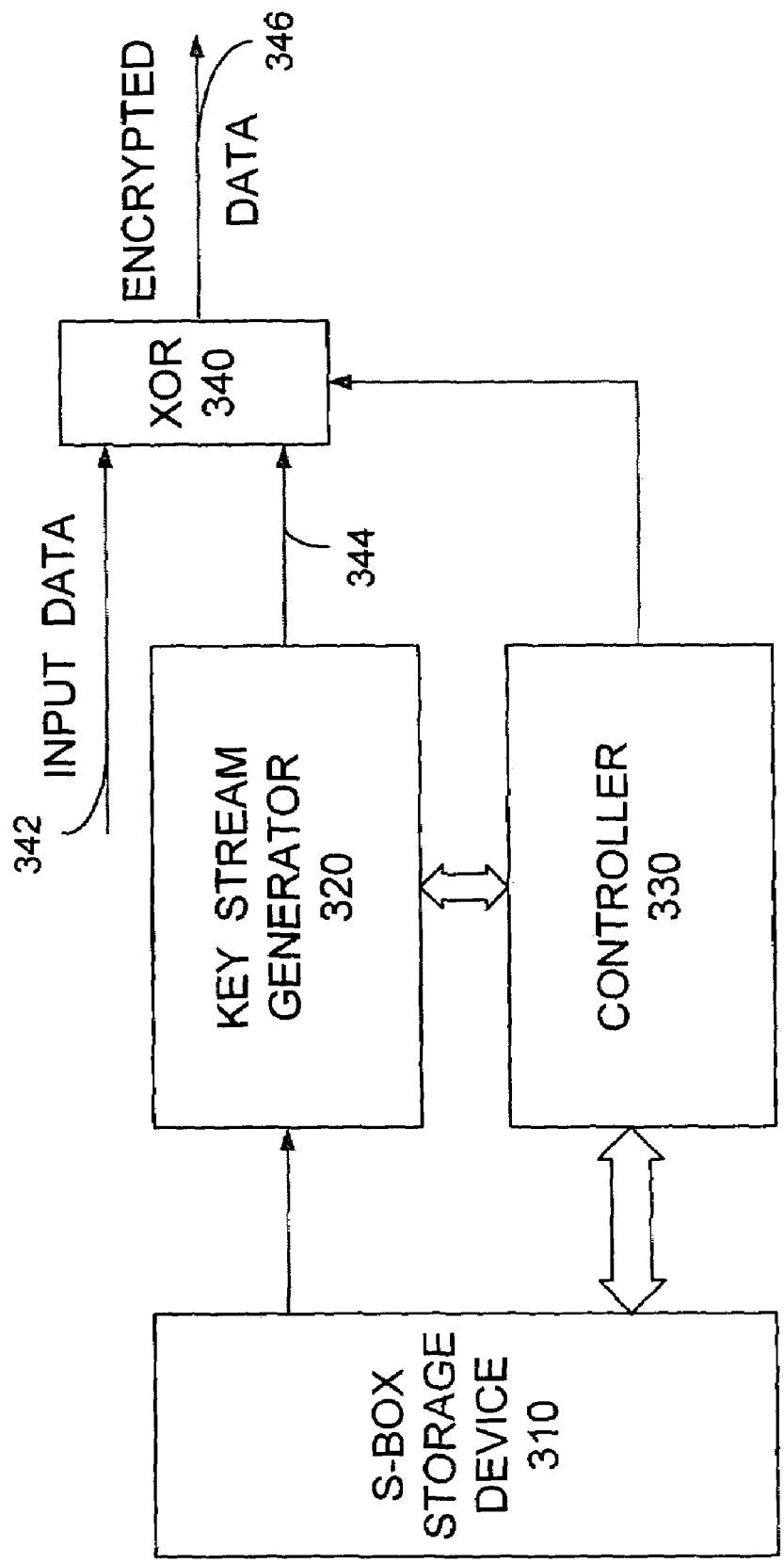
FIG. 3 is a diagram illustrating an example implementation of the RC4 ciphering process.

FIG. 3 depicts an example implementation of the encryption process using the RC4 ciphering process, according to an embodiment of the present invention. The S-box storage device 310 stores a 256 byte S-box. In one embodiment, the S-box storage device may be a register file. In another embodiment, the S-box storage may consist of flip-flops. When flip-flops are used, it may take approximately 2048 flops to store the 256 S-box. Implementation of 2048 flops may require a larger die area than a register file. The key stream generator 320 generates a key stream byte by byte by performing operations as illustrated from line 3 to line 7 of FIG. 2. The operations may comprise increasing a first index variable i, reading the $i^{th}$ byte of the S-box from the S-box storage device, calculating a second index variable j, swapping the $i^{th}$ byte and $j^{th}$ byte of the S-box in the S-box storage device, calculating a third index t, and reading the $t^{th}$ byte of the S-box from the S-box storage device. The controller 330 controls the S-box storage device and the key stream generator to produce the key stream, one byte at a time. The controller may instruct the S-box storage device when to make a particular byte available for read/write. The S-box storage device may also inform the controller when a particular byte is ready for read/write operations so that the controller may direct the key stream generator to perform a read/write operation from/to the S-box storage device. Additionally, the controller may help solve conflicts or correct errors for any read/write operations. The XOR mechanism 340 performs an XOR operation between the input data 342 and the key stream 344 to produce encrypted data 346 from the input data. The XOR mechanism performs the XOR operation one byte at a time under the direction of the controller. Thus, the output encrypted data 346 is produced byte by byte.

Figure 4:
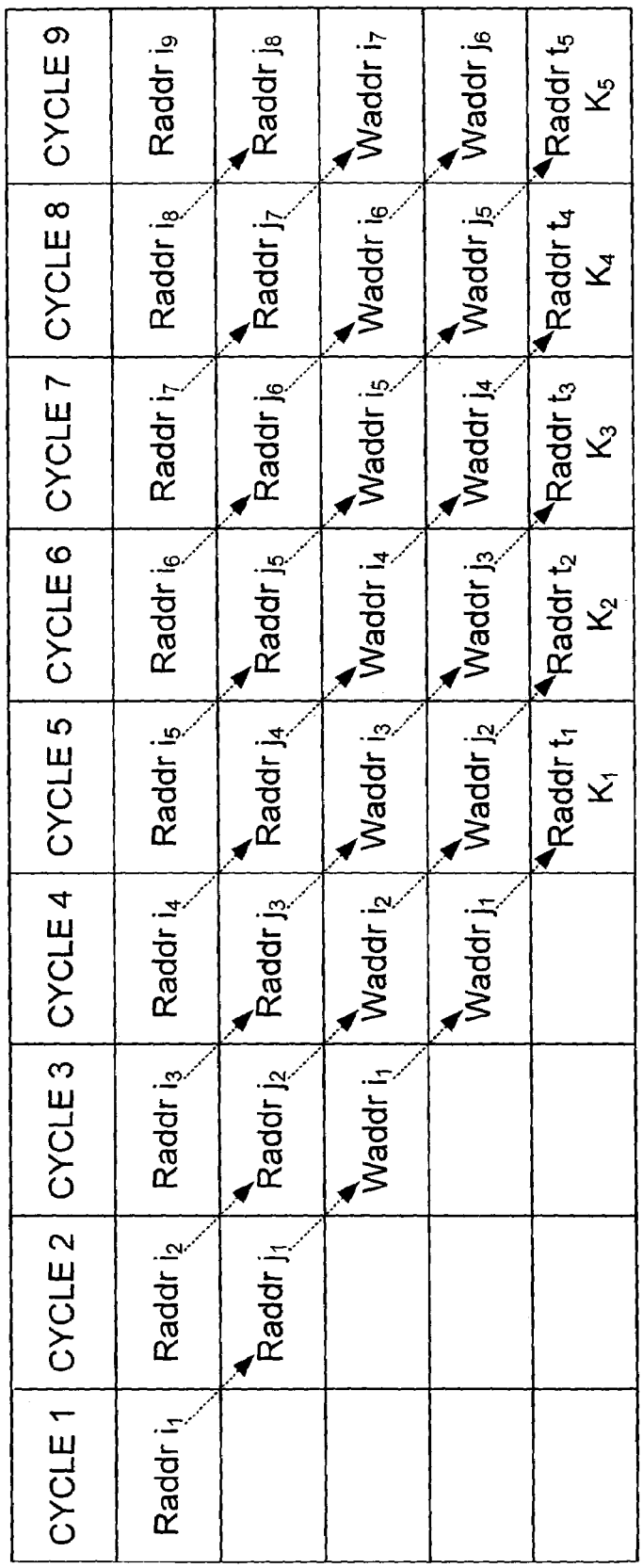
FIG. 4 is a table illustrating the pipelining of the RC4 ciphering process, according to an embodiment of the present invention.

In many applications, it is desirable to have a faster encryption speed because a slower encryption speed causes longer delays and limits the bandwidth of network communications. To improve the encryption speed by the RC4 ciphering process, the key stream generation process may be pipelined in one embodiment. A key stream generator using the pipelining technology may produce one byte of the key stream per clock cycle, that is, the key stream generator may achieve a throughput of one byte per cycle. FIG. 4 illustrates how a five-stage pipeline may be used to generate a key stream for the RC4 ciphering process. In order to pipeline the RC4 ciphering, the key generator and the controller (as shown in FIG. 3) may need to be modified to support the pipelining scheme. In FIG. 4, "Raddr $n_m$" denotes an operation of reading the $n_m^{th}$ byte of the S-box from the S-box storage device for generating the $m^{th}$ byte of the key stream, $K_m$. Similarly, "Waddr $n_m^{th}$" denotes an operation of writing to the S-box storage device at the $n_m^{th}$ byte of the S-box for generating the $m^{th}$ byte of the key stream, $K_m$. For convenience, FIG. 4 does not show any addition operation that comes with each read operation.

Generation of the first byte of the key stream, $K_1$, starts at cycle 1, during which the value of index variable $i_1$ is obtained by increasing the initial value $i_0$ by 1, and the $i_1^{th}$ byte of the S-box, $S[i_1]$, is read from the S-box storage device. In cycle 2, the value of index variable $j_1$ is calculated by adding the previous value of j (i.e., initial value of j, which is $j_0$) and $S[i_1]$ (i.e., $j_1=(j_0+S[i_1])$ mod 256), and subsequently the $j_1^{th}$ byte of the S-box, $S[j_1]$, is read from the S-box storage device. Additionally, generation of $K_2$ starts at cycle 2, during which $i_2$ is obtained by increasing $i_1$ by 1 and $S[i_2]$ is read from the S-box storage device. In cycle 3, $S[j_1]$ is written back to the S-box storage device to replace the $i_1^{th}$ byte of the S-box; $j_2$ is obtained ($j_2=(j_1+S[i_2])$ mod 256) and $S[j_2]$ is read from the S-box storage device; and generation of $K_3$ starts with obtaining $i_3$ ($=(i_2+1)$ mode 256) and reading $S[i_3]$ from the S-box storage device. In cycle 4, $S[i_1]$ is written back to the S-box storage device to replace the $j_1^{th}$ byte of the S-box; $S[j_2]$ is written back to the S-box storage device to replace the $i_2^{th}$ byte of the S-box; $j_3$ is obtained ($j_3=2+S[i_3]$) mod 256) and $S[j_2]$ is read from the S-box storage device; and generation of $K_4$ starts with obtaining $i_4$ ($=(i_3+1)$ mod 256) and reading $S[i_4]$ from the S-box storage device. In cycle 5, the value of index variable $t_1$ is obtained ($t_1=(S[i_1]+S[j_1])$ mod 256) and $S[t_1]$ is read from the S-box storage device; $S[i_2]$ is written back to the S-box storage device to replace the $j_2^{th}$ byte of the S-box; $S[j_3]$ is written back to the S-box storage device to replace the $j_3^{th}$ byte of the S-box; $j_4$ is obtained ($j_4=(j_3+S[i_4])$ mod 256) and $S[j_4]$ is read from the S-box storage device; and generation of $K_5$ starts with obtaining $i_5$ ($=(i_3+1)$ mod 256) and reading $S[i_5]$ from the S-box storage device. By the end of cycle 5, the first byte of the key stream, $K_1$ ($=S[t_1]$), is generated, which may be used to encrypt the first byte of the input data in cycle 6. From cycle 5 forward (including cycle 5), three read operations and two write operations are performed simultaneously with each cycle. Additionally, a byte of the key stream is generated at the end of each cycle from cycle 5 going forward. When the key stream to be generated contains many bytes, the throughput of the key stream generation process is approximately a byte per cycle (there is no byte of the key stream generated within the first 4 cycles).

Using a five stage pipeline, as shown in FIG. 4, an implementation of the RC4 ciphering process can achieve a throughput of one byte per cycle for the key stream generator. Such an approach requires three read operations and two write operations per cycle. Typically, the S-box for the RC4 algorithm is stored in a register file. Using a five stage pipeline as illustrated in FIG. 4 would require a register file with three read ports and two write ports ("3-read/2-write register file"). 3-read/2-write register files are not commonly available because they are complex and consume a large amount of die area compared to register files with less read/write ports. 3-read/2-write register files may even limit the frequency at which the RC4 ciphering process can operate. An alternative approach is to pipeline the key stream generation for the RC4 ciphering process but using a 2-read/1-write register file to store the S-box. Such an alternative approach, however, may reduce the throughput of the key stream generation significantly.

It is noted from FIG. 2 that the value of index variable i is incremented after each iteration, which means that S[i] is read and written from/to successive locations (bytes) in the S-box storage on successive iterations. Also cipher operations using the RC4 algorithm are typically performed on multi-byte messages, and hence multiple iterations of the algorithm as shown in FIG. 2 are performed to generate a key stream with multiple bytes. Therefore, several bytes of the S-box may be read from a register file at a time and stored in a cache. The number of bytes that are read from the register file at a time may vary (for example, it could be 4 or 8). The cache may be made of flip-flops. For the convenience of description, assume that the size of the cache is 8 bytes, that is, 8 bytes of the S-box may be read from the S-box storage device at a time. This would allow the key stream generator to read/write S[i] from/to the cache for the next 8 iterations (as shown in FIG. 2) to generate 8 bytes of key stream. At the end of the $8^{th}$ iteration, the 8 bytes in the cache may be written back to the register file in one operation. Using this approach, a 2-read/1-write register file may be used to store the S-box and the RC4 algorithm may still be able to achieve a throughput which is close to one byte per cycle for key stream generation.

Figure 5:
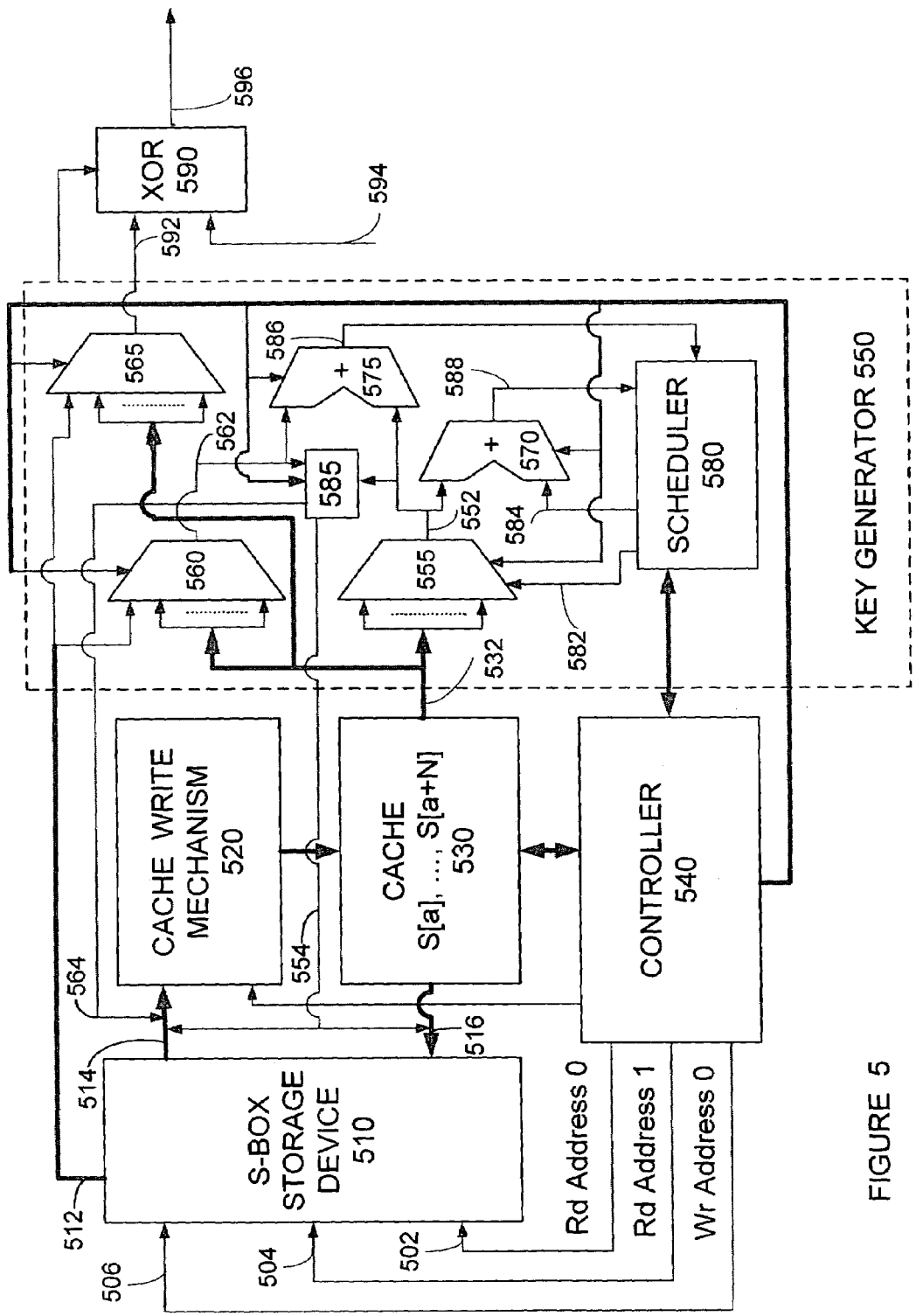
FIG. 5 is a diagram illustrating another example implementation of the RC4 ciphering process, according to an embodiment of the present invention.

FIG. 5 depicts an embodiment of the implementation of the RC4 ciphering process using a 2-read/1-write register file along with an N-byte cache (N can be any number). The S-box storage device 510 may be a 2-read/1-write register file. The S-box storage device has two read ports 512 and 514 and one write port 516. The addresses for read ports 512, 514, and write port 516 are provided by the controller 540 through lines 502, 504, and 506, respectively. The cache write mechanism 520 may read N bytes from the S-box storage device and write them to the cache 530. In one embodiment, the cache write mechanism may be integrated into the cache. The cache stores N bytes of the S-box read from the S-box storage device for use of generating N bytes of a key stream. S[i] is read from and written to successive locations in the S-box on successive iterations. Because of this predictability of S[i] among successive iterations of the RC4 ciphering process, N successive bytes of the S-box may be read from the S-box storage device and stored in the cache 530 so that S[i] may be read from and written to the cache directly for the next N iterations of the RC4 ciphering process.

The key generator 550 in FIG. 5 generates a byte of a key stream at the end of each iteration. The controller 540 controls the S-box storage device, the cache write mechanism, the cache, the key generator, and the XOR mechanism 590 so that they can work together to produce the encrypted output data for the input data byte by byte. The key generator 550 comprises a first selector 555, a second selector 560, a third selector 565, a first adder 570, a second adder 575, a swapping mechanism 585, and a scheduler 580. The first selector 555 selects an S[i] among N S-box bytes (532) from the cache 530 for the current iteration of the RC4 ciphering process, under the direction from the controller. The first adder 570 adds the value of j from the preceding iteration (584) and the value of S[i] (562) selected by the first selector to produce the value of j for the current iteration (588), under the direction from the controller. The scheduler 580 may initialize values of i and j to 0 before the first iteration; provide the first selector the value of i for the current iteration (582) by incrementing the value of i from the preceding iteration; and provide the first adder the value of j from the preceding iteration (584), under the direction of the controller. Additionally, the value of j for the current iteration (588), produced by the first adder, is sent to the scheduler so that the scheduler may request the controller 540 to obtain S[j] for the current iteration. It is possible that S[j] is currently in the cache. Because N bytes of S-box stored in the cache represent the most updated version of these bytes, the controller will direct that S[j] be read from the cache instead of the S-box storage device, if both the cache and the S-box storage device contain S[j]. The second selector 560 selects one byte as S[j] among the bytes stored in the cache and the byte read from the S-box storage device, if there is any, under the control of the controller.

S[j] (562), selected by the second selector, is subsequently swapped with S[i] (552), selected by the first selector, by the swapping mechanism 585 under the control of the controller. During the swapping process, S[j] (shown as 564 in FIG. 5) is written to the cache 530 to replace S[i] through the cache write mechanism 520. In the meanwhile, S[i] (shown as 554 in FIG. 5) is written back to the S-box storage device if S[j] used for the current iteration is from the S-box storage device to replace S[j]. If S[j] was read from the cache, on the other hand, S[i] is written back to the cache to replace S[j]. Furthermore, values of S[i] and S[j], selected by the first and second selectors, respectively, are added together to produce a value for a third index variable t (586). The value of t (586) is sent to the scheduler 580 so that the scheduler may request the controller to obtain S[t] for the current iteration. It is possible that S[t] is currently in the cache. Because N bytes of S-box stored in the cache represent the most updated version of these bytes (bytes in the cache are updated during the process of key stream generation), the controller will direct that S[t] be read from the cache instead of the S-box storage device, if both the cache and the S-box storage device contain S[t]. The third selector 565 selects one byte as S[t] among the bytes stored in the cache and the byte read from the S-box storage device, if there is any, under the control of the controller. S[t] (592), selected by the third selector, is the byte of the key stream, K, for the current iteration. Subsequently, K is XORed with the corresponding byte of the input data 594 by the XOR mechanism 590 to produce the encrypted byte 596 for the byte of the input data.

Because values of all S-box index variables, i, j, and t, are between 0 and 255, including 0 and 255 (assume that the S-box has a total of 256 bytes; and if the S-box has a total of M bytes, the value of j should be between 0 and M-1), the increment operation performed by the scheduler, and the addition operations performed by the first and second adders are all modulo 256 ("mod 256") or "mod M" operations. After N iterations, N bytes in the cache may be written back to the S-box. Note that values of the N bytes written back may be different from values of N bytes originally read from the S-box storage device before N iterations were started.

FIG. 6 illustrates how a three-stage pipeline may be used to generate a key stream for the embodiment shown in FIG. 5. To pipeline key stream generation, the controller 540 and the key generator 550 (especially the scheduler 580), as shown in FIG. 5, may need to be modified so that each iteration may start at each clock cycle, when possible. In FIG. 6, "Raddr $n_m$" denotes an operation of reading the $n_m^{th}$ byte of the S-box from the S-box storage device for generating the $m^{th}$ byte of the key stream, $K_m$. "Waddr $n_m$" denotes an operation of writing to the S-box storage device at the $n_m^{th}$ byte of the S-box for generating the $m^{th}$ byte of the key stream, $K_m$. "Raddr $n_m$-$n_I$" denotes an operation of reading N consecutive bytes of the S-box, starting from the $n_m^{th}$ byte, from the S-box storage device to the cache for generating the $m^{th}$ through the $I^{th}$ bytes of the key stream, $K_m$ through $K_I$ (where N is the size of the cache and I=m+N−1). "Waddr $n_m$-$n_I$" denotes an operation of writing N bytes from the cache to the S-box storage device to replace N consecutive bytes originally read from the S-box storage device for generating $K_m$ through $K_I$ (where N is the size of the cache and I=m+N−1). For convenience, FIG. 6 does not show any addition operation that comes along with each read operation. The size of the cache is typically the same as the line size of a register file, which may be 4 bytes, 8 bytes, 16 bytes, or any other numbers. FIG. 6 assumes that the size of the cache is 8 bytes so that 8 consecutive bytes from the S-box storage device may be read at a time and stored in the cache.

As shown in FIG. 6, in cycle 1, the value of index variable $i_1$ is obtained by increasing the initial value $i_0$ by 1; and 8 consecutive bytes in the S-box storage device, starting from the $i_1^{th}$ byte, are read to the cache. In cycle 2, the value of index variable $j_1$ is calculated by adding the previous value of j (i.e., initial value of j, which is $j_0$) and $S[i_1]$ (i.e., $j_1=(j_0+S[i_1])$ mod 256), and subsequently the $j_1^{th}$ byte of the S-box, $S[j_1]$, is read from the cache if it is in the cache, and otherwise from the S-box storage device. In cycle 3, $S[j_1]$ is written to the cache to replace the $i_1^{th}$ byte of the S-box, and $S[i_1]$ is written to the cache to replace $S[j_1]$ if $S[j_1]$ was read from the cache in cycle 2, and otherwise, $S[i_1]$ is written back to the S-box storage device to replace $S[j_1]$; $j_2$ is obtained ($j_2=(j_1+S[i_2])$ mod 256) and $S[j_2]$ is read from the cache if it is in the cache, and otherwise from the S-box storage device; and the value of index variable $t_1$ is obtained ($t_1=(S[i_1]+S[j_1])$ mod 256) and $S[t_1]$ is read from the cache if it is in the cache, and otherwise from the S-box storage device. By the end of cycle 3, the first byte of the key stream, $K_1$ (=$S[t_1]$), is generated, which may be used to encrypt the first byte of the input data. From cycle 3 to cycle 10 (including cycles 3 and 10), two read operations and one write operation are performed simultaneously with each cycle; and a byte of the key stream is generated at the end of each cycle.

After cycle 9, all 8 bytes in the cache, which were read from the S-box storage device in cycle 1, have been read and used to generate the value for index variable j. In cycle 10, another 8 consecutive bytes in the S-box, starting from the $i_g^{th}$ byte ($i_9=i_8+1=i_1+8$), are read from the S-box storage device to the cache through the cache write mechanism, which may temporarily hold these newly-read 8 bytes before bytes currently in the cache are written back to the S-box storage device. Also in cycle 10, $S[i_8]$ is written to the cache to replace the $i_8^{th}$ byte of the S-box, and $S[i_8]$ is written to the cache to replace $S[j_8]$ if $S[j_8]$ was read from the cache in cycle 9, and otherwise, $S[i_8]$ is written back to the S-box storage device to replace $S[j_8]$ there; and $t_8$ is obtained ($t_8=(S[i_8]+S[j_8])$ mod 256) and $S[t_8]$ is read from the cache if it is in the cache, and otherwise from the S-box storage device. In cycle 11, 8 bytes currently in the cache may be written back to the S-box storage device to replace bytes from the $i_1^{th}$ to the $i_8^{th}$ (bytes being written back may not be the same as those bytes originally read from the same place in the S-box storage device because of swapping operations). Subsequently, the newly-read 8 consecutive bytes in cycle 9 may be moved from the cache write mechanism to the cache. Also in cycle 11, $j_9$ is obtained ($j_9=(j_8+S[i_9])$ mod 256, the value of $S[i_9]$ may be obtained when 8 bytes were read from the S-box storage device in cycle 9) and $S[j_2]$ is read from the S-box storage device. In the next 8 cycles starting from cycle 12, two read operations and one write operation will be performed and one byte of the key stream may be generated in each cycle. Overall, using a three-stage pipeline as illustrated in FIG. 6, an embodiment of this invention may achieve a throughput of 8 bytes every 9 cycles for key stream generation. This throughput is close to one byte per cycle.

Figure 7:
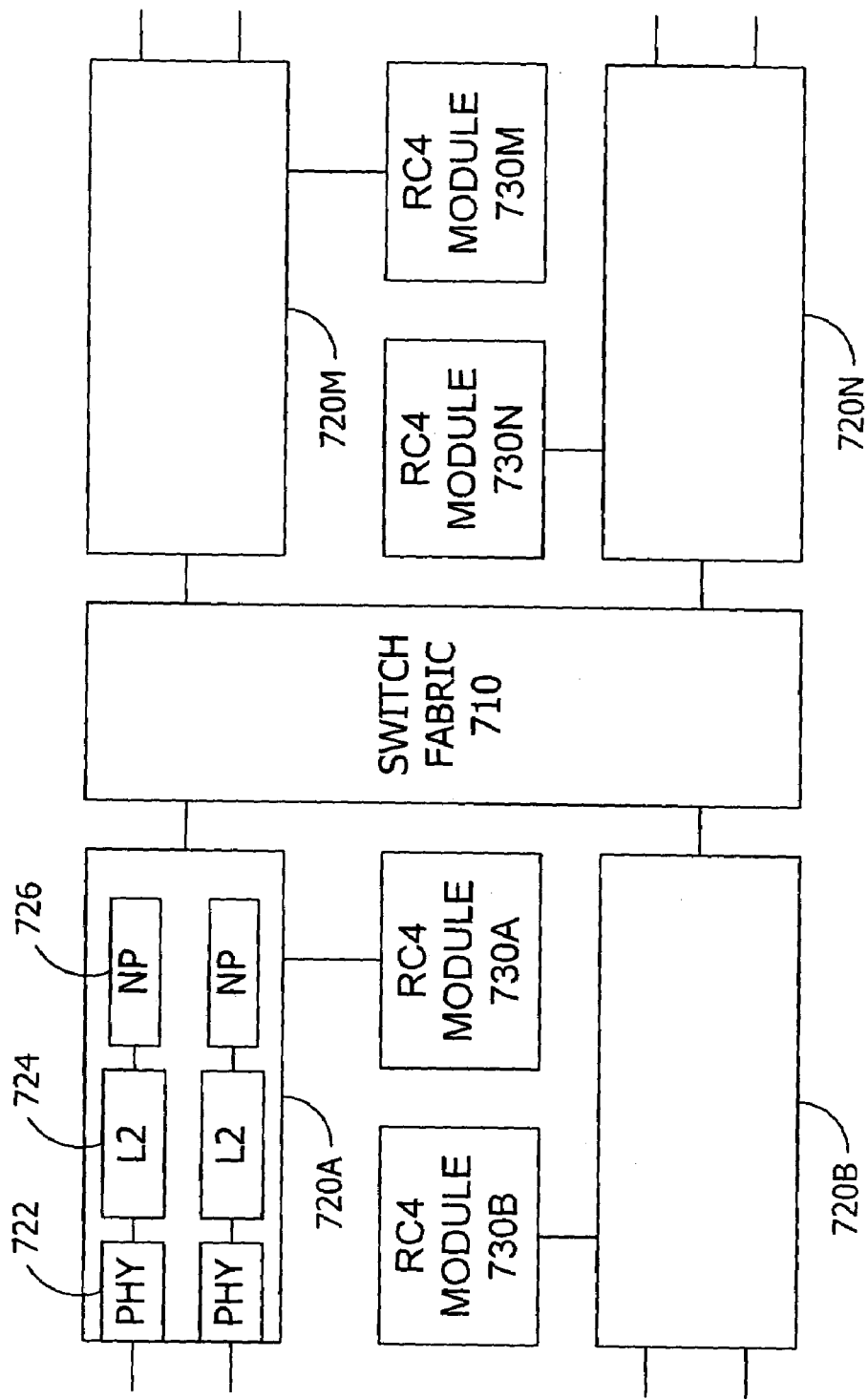
FIG. 7 is a diagram of a network system.

FIG. 7 depicts a network system that can perform RC4 ciphering. The system may comprise a collection of line cards 720 ("blades") interconnected by a switch fabric 710 (e.g., a crossbar or shared memory switch fabric). Individual line cards may be located in the same physical location or different physical locations (e.g., different cities). The switch fabric, for example, may conform to Common Switch Interface (CSIX) or other fabric technologies such as HyperTransport, Infiniband, Peripheral Component Interconnect (PCI), Packet-Over-SONET (Synchronous Optic Network), RapidIO, and/or UTOPIA (Universal Test and Operations PHY (Physical Layer) Interface for ATM).

Individual line cards (e.g., 720A) may include one or more physical layer (PHY) devices 722 (e.g., optic, wire, and wireless PHYs) that handle communication over network connections. The PHYs translate between the physical signals carried by different network mediums and the bits (e.g., "0"-s and "1"-s) used by digital systems. The line cards 720 may also include framer devices (e.g., Ethernet, Synchronous Optic Network (SONET), High-Level Data Link (HDLC) framers or other "layer 2" devices) 724 that can perform operations on frames such as error detection and/or correction. The line cards 720 shown may also include one or more network processors 726 that perform packet processing operations for packets received via the PHY(s) 722 and direct the packets, via the switch fabric 710, to a line card providing an egress interface to forward the packet. Potentially, the network processor(s) 726 may perform "layer 2" duties instead of the framer devices 724.

The network processor(s) 726 may be an Intel® Internet eXchange network Processor (IXP) or other network processors featuring different designs. The network processor features a collection of packet processing engines on a single integrated circuit. Individual engines may provide multiple threads of execution. Additionally, the network processor includes a core processor (that is often programmed to perform "control plane" tasks involved in network operations. The core processor, however, may also handle "data plane" tasks. The network processor 726 also features at least one interface that can carry packets between the processor and other network components. For example, the processor can feature a switch fabric interface 710 that enables the processor 726 to transmit a packet to other processor(s) or circuitry connected to the fabric. The processor 726 can also feature an interface that enables the processor to communicate with physical layer (PHY) and/or link layer devices (e.g., MAC or framer devices). The processor 726 also includes an interface (e.g., a Peripheral Component Interconnect (PCI) bus interface) for communicating, for example, with a host or other network processors. Moreover, the processor 726 also includes other components shared by the engines such as memory controllers a hash engine, and internal scratchpad memory.

As shown in FIG. 7, each line card 720 may be operably coupled with at least one RC4 module 730 (e.g., 730A) that performs RC4 ciphering. In one embodiment, the RC4 module may be separate from the line card. In another embodiment, the RC4 module may be integrated with the line card. Also in one embodiment, the RC4 module may be a part of the network processor 726 or a part of the PHY 722. Yet in another embodiment, the RC4 module may be located in other network layers such as link layer, network layer, and/or application layer.

Although an example embodiment of the present disclosure is described with reference to diagrams in FIGS. 1-7, persons of ordinary skill in the art will readily appreciate that many other methods of implementing the present disclosure may alternatively be used. For example, the order of execution of the functional blocks or process procedures may be changed, and/or some of the functional blocks or process procedures described may be changed, eliminated, or combined.

In the preceding description, various aspects of the present disclosure have been described. For purposes of explanation, specific numbers, systems and configurations were set forth in order to provide a thorough understanding of the present disclosure. However, it is apparent to one skilled in the art having the benefit of this disclosure that the present disclosure may be practiced without the specific details. In other instances, well-known features, components, or modules were omitted, simplified, combined, or split in order not to obscure the present disclosure.

Embodiments of the present disclosure described herein may be implemented in circuitry, which includes hardwired circuitry, digital circuitry, analog circuitry, programmable circuitry, and so forth. They may also be implemented in computer programs. Such computer programs may be coded in a high level procedural or object oriented programming language. However, the program(s) can be implemented in assembly or machine language if desired. The language may be compiled or interpreted. Additionally, these techniques may be used in a wide variety of networking environments. Such computer programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the disclosure may also be considered to be implemented as a machine-readable storage medium, configured for use with a processing system, where the storage medium so configured causes the processing system to operate in a specific and predefined manner to perform the functions described herein.

While this disclosure has been described with reference to illustrative embodiments, this description is not intended to be construed in a limiting sense. Various modifications of the illustrative embodiments, as well as other embodiments of the disclosure, which are apparent to persons skilled in the art to which the disclosure pertains are deemed to lie within the spirit and scope of the disclosure.

What is claimed is:

1. An apparatus for performing RC4 ciphering, the apparatus comprising:
    an S-box storage device comprising a two-read/one-write register file configured to store an array of M state bytes and configured to allow N successive bytes of the array of M state bytes to be read from or written to the register file at a time;
    an N-byte cache coupled to the S-box storage device, the N-byte cache configured to store the N successive bytes of the array of state bytes and configured to allow each byte of the N successive bytes to be read from or written to the N-byte cache;
    a cache write mechanism coupled to the S-box storage device and the N-byte cache, the cache write mechanism configured to read the N successive bytes of the array of state bytes from the S-box storage device and to write the N successive bytes to the N-byte cache;
    a key generator coupled to the S-box storage device, the N-byte cache and the cache write mechanism, the key generator configured to generate a byte of a key stream for each iteration of N iterations based on a first state byte corresponding to a first index, i, stored in the N-byte cache and a second and a third state byte corresponding to a second index, j, and a third index, t, respectively, stored in at least one of the N-byte cache and the S-box storage device; and
    a controller coupled to the S-box storage device, the N-byte cache, the cache write mechanism and the key generator, the controller configured to control the S-box storage device, the N-byte cache, the cache write mechanism and the key generator to generate the byte of the key stream for each iteration of the N iterations and to write the N successive bytes from the N-byte cache to the S-box storage device after the Nth iteration.

2. The apparatus of claim 1 wherein the key generator comprises:
    a first selector configured to select a first state byte from the N successive bytes in the N-byte cache based on the first index;
    a second selector configured to select a second state byte from at least one of the N-byte cache and the S-box storage device based on the second index;
    a third selector configured to select a third state byte from at least one of the N-byte cache and the S-box storage device based on the third index;
    a first adder configured to generate the second index based on the first state byte;
    a second adder configured to generate the third index based on the first state byte and the second state byte;
    a swapping mechanism configured to swap the first state byte and the second state byte; and
    a scheduler configured to: initialize the first index and the second index, provide the first index for a current iteration to the first selector, provide the second index from a preceding iteration to the first adder and to receive the second index for the current iteration from the N-byte cache or the S-box storage device.

3. The apparatus of claim 1 further comprising an XOR mechanism coupled to the key generator and the controller, the XOR mechanism configured to receive a byte of input data for each iteration of the N iterations and to calculate an output based on the byte of input data and the third state byte corresponding to the third index for each iteration of the N iterations, under control of the controller.

4. The apparatus of claim 1 wherein generating the byte of the key stream for each iteration of the N iterations is pipelined so that, at most, two reads to and one write from the S-box storage device occur in a cycle.

5. The apparatus of claim 1 wherein N is a line size of the S-box storage device.

6. The apparatus of claim 1 wherein M is a whole number multiple of N.

7. The apparatus of claim 1 wherein the cache write mechanism is configured to temporarily store the N successive read bytes while waiting for a prior N successive bytes to be written to the S-box storage device from the N-byte cache.

8. The apparatus of claim 1 wherein the controller is further configured to select whether the second state byte is read from the N-byte cache or the S-box storage device and whether the third state byte is read from the N-byte cache or the S-box storage device.

9. A method for performing RC4 ciphering, the method comprising:

receiving a plurality of bytes of input data;

initializing a first index, i, and a second index, j, using a key generator;

performing a first set of operations for the plurality of bytes of input data under control of a controller, the first set of operations comprising:

reading N successive bytes of state data from an S-box storage device comprising a two-read/one-write register file and writing the N successive bytes of state data to an N byte read/write cache in one cycle using a cache write mechanism wherein the S-box storage device contains M bytes of state data, and performing a second set of operations for each state byte of the N successive bytes of state data, the second set of operations comprising:

generating a byte of a key stream based on at least one state byte of the N successive bytes of state data from the N-byte cache using the key generator, and generating an output byte based on the byte of the key stream and an input byte of the plurality of bytes of input data; and writing the N successive bytes of state data from the N-byte cache to the S-box storage device in one cycle; and repeating the first set of operations until the plurality of input bytes has been processed.

10. The method of claim 9 wherein generating a byte of the key stream comprises:

incrementing the first index, i;

reading a first state byte corresponding to the first index, i, from the N-byte cache, calculating the second index, j, based on the first state byte;

reading a second state byte corresponding to the second index from at least one of the N-byte cache or the S-box storage device;

writing the second state byte to a location in the N-byte cache corresponding to the first index;

writing the first state byte to a location in at least one of the N-byte cache or the S-box storage device corresponding to the second index;

calculating a third index, t, based on the first state byte and the second state byte; and reading a third state byte corresponding to the third index from at least one of the N-byte cache or the S-box storage device wherein the third state byte is the byte of the key stream.

11. The method of claim 9 further comprising initializing the M bytes of state data in the S-box storage device based on a private key.

12. The method of claim 9 further comprising temporarily storing another N successive bytes in the cache write mechanism while waiting for the N successive bytes to be written to the S-box storage device from the N-byte cache.

13. The method of claim 9 wherein the generating is pipelined so that, at most, two reads to and one write from the S-box storage device are performed in one cycle.

14. The method of claim 9 wherein M is a whole number multiple of N.

15. A network system comprising:

a switch fabric;

a plurality of line cards interconnected by the switch fabric; and a plurality of RC4 modules, each RC4 module coupled to a line card and configured to perform RC4 ciphering, each RC4 module comprising:

an S-box storage device comprising a two-read/one-write register file configured to store an array of M state bytes and configured to allow N successive bytes of the array of M state bytes to be read from or written to the register file at a time;

an N-byte cache coupled to the S-box storage device, the N-byte cache configured to store the N successive bytes of the array of state bytes and configured to allow each byte of the N successive bytes to be read from or written to the N-byte cache;

a cache write mechanism coupled to the S-box storage device and the N-byte cache, the cache write mechanism configured to read the N successive bytes of the array of state bytes from the S-box storage device and to write the N successive bytes to the N-byte cache;

a key generator coupled to the S-box storage device, the N-byte cache and the cache write mechanism, the key generator configured to generate a byte of a key stream for each iteration of N iterations based on a first state byte corresponding to a first index, i, stored in the N-byte cache and a second and a third state byte corresponding to a second index, j, and a third index, t, respectively, stored in at least one of the N-byte cache and the S-box storage device; and a controller coupled to the S-box storage device, the N-byte cache, the cache write mechanism and the key generator, the controller configured to control the S-box storage device, the N-byte cache, the cache write mechanism and the key generator to generate the byte of the key stream for each iteration of the N iterations and to write the N successive bytes from the N-byte cache to the S-box storage device after the Nth iteration.

16. The network system of claim 15 wherein each key generator comprises:

a first selector configured to select a first state byte from the N successive bytes in the N-byte cache based on the first index;

a second selector configured to select a second state byte from at least one of the N-byte cache and the S-box storage device based on the second index;

a third selector configured to select a third state byte from at least one of the N-byte cache and the S-box storage device based on the third index;

a first adder configured to generate the second index based on the first state byte;

a second adder configured to generate the third index based on the first state byte and the second state byte;

a swapping mechanism configured to swap the first state byte and the second state byte; and a scheduler configured to: initialize the first index and the second index, provide the first index for a current iteration to the first selector, provide the second index from a preceding iteration to the first adder and to receive the second index for the current iteration from the N-byte cache or the S-box storage device.

17. The network system of claim 15 wherein each RC4 module further comprises an XOR mechanism coupled to the key generator and the controller, the XOR mechanism configured to receive a byte of input data for each iteration of the N iterations and to calculate an output based on the byte of input data and the third state byte corresponding to the third index for each iteration of the N iterations, under control of the controller.

18. The network system of claim 15 wherein generating the byte of the key stream for each iteration of the N iterations is pipelined so that, at most, two reads to and one write from the S-box storage device occur in a cycle.

19. The network system of claim 15 wherein the controller is configured to detect and resolve collisions between the S-box storage device and the N-byte cache during read/write operations.

20. The network system of claim 15 wherein initial values of the array of M state bytes are generated from a secret key shared by a receiver and a transmitter in the network system.

* * * * *